(12) United States Patent
Lesartre et al.

(10) Patent No.: US 7,950,917 B2
(45) Date of Patent: May 31, 2011

(54) PROCESS AND INSTALLATION FOR MOLDING AN OPTICAL LENS

(75) Inventors: Noémie Lesartre, Paris (FR); Jérôme Dupuy, Villeurbanne (FR); Abderrahim Maazouz, Villeurbane (FR); Jean-Pierre Pascault, Villeurbanne (FR)

(73) Assignee: Institut National Des Sciences Appliquees (Insa), Villeurbanne (FR)

( * ) Notice: Subject to any disclaimer, the term of this patent is extended or adjusted under 35 U.S.C. 154(b) by 629 days.

(21) Appl. No.: 10/598,357

(22) PCT Filed: Feb. 25, 2005

(86) PCT No.: PCT/EP2005/002104
§ 371 (c)(1),
(2), (4) Date: Apr. 23, 2008

(87) PCT Pub. No.: WO2005/084927
PCT Pub. Date: Sep. 15, 2005

(65) Prior Publication Data
US 2008/0230931 A1    Sep. 25, 2008

(30) Foreign Application Priority Data

Feb. 27, 2004  (EP) .................................... 04300102

(51) Int. Cl.
*B29D 11/00*     (2006.01)
*B29C 45/30*     (2006.01)
(52) U.S. Cl. ........ 425/571; 425/585; 425/808; 249/141; 264/328.12

(58) Field of Classification Search .................. 425/567, 425/568, 571, 585, 589, 595, 190, 192 R, 425/401, 405.1, 450, 808, DIG. 60; 264/1.32, 264/2.5, 328.12, 328.9; 249/57, 141
See application file for complete search history.

(56) References Cited

U.S. PATENT DOCUMENTS 3,368,245 A * 2/1968 Witkowski .................... 425/215
(Continued)

FOREIGN PATENT DOCUMENTS

EP          0348129          12/1989
(Continued)

OTHER PUBLICATIONS

Molnar Jr. and Lee, "Mixing study of L shape mixheads in injection molding," *J. Applied Polymer Science*, 37:2295-2312, 1989.

*Primary Examiner* — Joseph S Del Sole
*Assistant Examiner* — Dimple Bodawala
(74) *Attorney, Agent, or Firm* — Fulbright & Jaworski L.L.P.

(57) ABSTRACT

The object of the invention is a process for molding an optical element such as a lens (2). According to the invention, the element is obtained by a reaction injection molding process comprising the steps of mixing at least two polymerizing reactants and forcing the obtained reacting mixture by an injection duct (5) for filling under pressure a scaled mold cavity (4) having an entry side (43) provided with a casting opening (42) and an evacuation side (44) and providing a laminated flow of mixture in a spout (6) having a progressive enlarging transversal section between the outlet opening (52) of the injection duct (5) and the casting opening (42) of the mold cavity (4), for avoiding any turbulent area in said laminated flow, said evacuation side (44) being provided with means (45) for evacuating air contained in the mixture during mold filling. The invention also covers the molding installation adapted for using such a process.

11 Claims, 2 Drawing Sheets

U.S. PATENT DOCUMENTS

| | | | |
|---|---|---|---|
| 3,894,710 A * | 7/1975 | Sarofeen | 249/117 |
| 4,252,294 A * | 2/1981 | Uchio | 249/105 |
| 4,693,446 A * | 9/1987 | Orlosky | 249/53 R |
| 5,139,724 A * | 8/1992 | Hofstetter et al. | 264/101 |
| 5,523,045 A * | 6/1996 | Kudert et al. | 264/513 |
| 5,656,210 A * | 8/1997 | Hill et al. | 264/2.6 |
| 6,214,261 B1 * | 4/2001 | Smarto et al. | 264/1.7 |
| 6,416,689 B1 * | 7/2002 | Keita et al. | 264/1.1 |
| 6,843,940 B2 * | 1/2005 | Reed et al. | 264/2.2 |
| 2002/0153623 A1 | 10/2002 | Gobron et al. | 262/1.1 |
| 2002/0163095 A1 * | 11/2002 | Andino et al. | 264/2.2 |
| 2003/0122281 A1 * | 7/2003 | Osawa et al. | 264/328.12 |
| 2003/0173692 A1 * | 9/2003 | Su et al. | 264/2.5 |
| 2004/0017610 A1 | 1/2004 | Evans et al. | 359/490 |
| 2005/0001140 A1 * | 1/2005 | Su et al. | 249/120 |
| 2005/0200033 A1 * | 9/2005 | Kadota et al. | 264/1.31 |

FOREIGN PATENT DOCUMENTS

| | | |
|---|---|---|
| EP | 0748685 | 12/1996 |
| WO | WO03/084728 A1 * | 10/2003 |

* cited by examiner

PROCESS AND INSTALLATION FOR MOLDING AN OPTICAL LENS

This application is a national phase application under 35 U.S.C. §371 of International Application No. PCT/EP2005/002104 filed 25 Feb. 2005, which claims priority to European Application No. 04300102.3 filed 27 Feb. 2004. The entire text of each of the above-referenced disclosures is specifically incorporated herein by reference without disclaimer.

The present invention relates to a process and an installation for molding an optical element by reaction injection molding.

Optical elements such as a lens having a substantially circular shape and a substantially regular transversal thickness may be advantageously obtained by molding at least two polymerizing reactants forming a gel in a mold cavity.

However, an optical element and particularly a lens must be homogeneous and it is necessary to avoid a partial solidification of the element. To this aim, the reactants have to remain liquid during the time necessary for filling the mold cavity.

Therefore, until now, the reactants have been chosen for delaying the solidification until the mold cavity is completely filled.

A first object of the present invention is, thus, to increase the productivity by shortening the time necessary for mixing the reactants and molding the optical element.

Another object of the invention is to have broader possibilities of choosing the reactants to be molded.

To this end, it has been discovered that a process known as "Reaction Injection Molding" (RIM) would be particularly advantageous for forming an optical element.

Indeed, in the RIM process, mixing of the two reactants is obtained by jet impingement in a mixing head comprising a mixing chamber connected to the mold cavity by an injection duct associated with a piston forcing the required quantity of mixture to fill under pressure the mold cavity.

Mixing and injecting being very rapid, fast-polymerizing reactants may be used.

Therefore, if such a process is used for forming optical elements, a broader choice of reactants is allowed.

Moreover, the productivity of this process is very high.

However, air could be entrapped by the jet impingement mixing, thus forming bubbles in the mixture filling the mold cavity.

The process according to the invention comprises the steps of mixing at least two polymerizing reactants in a mixing chamber for obtaining a reacting mixture and forcing said mixture to flow by an injection duct for filling under pressure a sealed mold cavity having an entry side provided with a casting opening and an evacuation side and providing a laminated flow of mixture in a spout having a progressive enlarging transversal section between an outlet opening of the injection duct and the casting opening of the mold cavity, the evacuation side of said mold cavity being provided with means for evacuating air eventually contained in the mixture during mold filling before solidification of the element.

Thus, firstly using a laminated flow of mixture permits to avoid any turbulent area in said molding mixture and secondly, the air eventually entrapped by the mixing of the reactants only forms a bubble nucleation in the mixture and the bubbles growing during the polymerizing reaction may be evacuated before solidification.

Thus, air entrapment and turbulence in the mixture filling the mold are avoided.

In particular, for forming an optical element having a substantially circular shape and a substantially regular transversal thickness the sealed mold cavity has a substantially circular shape and a transversal thickness corresponding to those of the element and the spout provides a substantially flat space having an axis substantially passing by the center of the mold cavity and being limited by two flat faces and two diverging sides inclined on either side of said axis and tangentially connecting to the circular shape of the mold cavity.

According to a preferred embodiment, the said casting opening of the mold cavity largely opens along a sector of the circular shape of the mold cavity and said flat faces of the spout each have a substantially trapezoidal shape with a large curvilinear base extending along said sector of the mold cavity and a short base connecting the outlet opening of the injection duct.

Advantageously, the process comprises a compression step of the molding mixture after the mold cavity has been filled completely.

According to another preferred characteristic of the invention, the process comprises the step of trapping a first part of the mixture upwards of the injection flow in a final part of the injection duct provided between the outlet opening and a closed end.

The mold cavity is limited by two plates between which is inserted a circular seal comprising at least a vent for evacuating air during mold filling and the process advantageously comprises the steps of exerting an increased clamping force, at the end of mold filling, between the plates limiting the mold cavity, for compressing the circular seal and closing the vent, and then applying a post-injection pressure in the molded mixture.

Moreover, the present invention covers a molding installation for forming an optical element having a substantially circular shape and a substantially regular transversal thickness, said installation comprising:

a mixing chamber for preparing a mixture to be molded, a sealed mold cavity with a substantially circular shape having a center and a transversal thickness corresponding to those of the element to be obtained, said mold cavity being limited by two plates between which is inserted an elongated seal, and having an entry side provided with a casting opening and an evacuation side opposite to said entry side, an injection duct connecting said mixing chamber to said mold cavity, said injection duct having an outlet opening, a spout connecting said outlet opening of the injection duct to the casting opening of the mold cavity, filling means for forcing said mixture to flow from the mixing chamber to the mold cavity via said injection duct and said spout for filling said mold cavity under pressure, at least a vent provided on said evacuation side of the mold cavity and connected to air evacuation means, said spout providing a substantially flat space having an axis substantially passing by the center of the mold cavity and being limited by two flat faces and two diverging sides inclined on either side of said axis and tangentially connecting to the circular shape of the mold cavity, said casting opening of the mold cavity having a narrow rectangular section largely opening along a sector of the circular shape of the mold cavity and said flat faces of the spout each having a substantially trapezoidal shape with a large curvilinear base extending along said sector of the mold cavity and a short base connecting the outlet opening of the injection duct.

According to a preferred embodiment, the injection duct extends downwards in the flow direction of the outlet opening until a closed end, which is separated from, said outlet opening by a space forming a reserve for trapping a first part of the mixture flowing upwards in said injection duct before entering in the enlarging spout.

Each vent provided on the evacuation side of the mold cavity may be constituted by at least an aperture, which is small enough to avoid reactants containing the mixture to flow outside.

According to another preferred embodiment, each vent provided on the evacuation side of the mold cavity is closed by a removable valve, said valve being open during mold filling and being closed after air evacuation, for applying a post-injection pressure in said mold cavity.

Advantageously, a second cavity may be provided on the evacuation side of the mold cavity for trapping air contained in the mixture to be molded, said mold cavity and said second cavity being surrounded by a common continuous seal.

According to another preferred embodiment, the mold cavity extends along an inclined median plane making an angle different from zero with the horizontal and comprises a lowest part and a highest part respectively constituting the entry side and the evacuation side of said mold cavity.

Other advantageous characteristics of the process and of the installation are covered by the claims.

The invention will be now described referring to a preferred embodiment illustrated by the hereattached drawings.

As above indicated, the object of the invention is to produce optical element by reaction injection molding, such a process being very rapid and allowing a larger choice of reactants.

In the Reaction Injection Molding (RIM) process which is known since many years for producing polymer products, a reaction mixture is produced in a mixhead by jet impingement and immediately injected in a mold.

Such mixheads may be of different types and are described, for example in the "Journal of Applied Polymer Science", vol. 37, 2295-2312 (1989). Thus a detailed description is not necessary.

Figure 1:
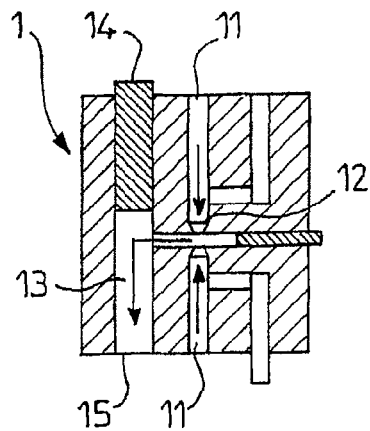
FIG. 1 is schematical view of a mixing head for RIM process.

Only as an example, FIG. 1 shows schematically a mixhead 1 of the L type comprising two opposed nozzles 11 for injecting two polymerizing reactants in a mixing chamber 12 to obtain a reacting mixture by jet-to-jet impingement of the reactant streams, said mixture being forced by a plunger in a second chamber 13 associated with a second plunger 14 which moves along the chamber 13 for pressing the mixture into a mold via an injection duct.

The RIM Process may be advantageously used for rapidly molding of polyurethane products as described in US 2002/0153623, the reactants being a polyisocyanate (NCO) compound and a polyhydroxyle OH compound. The RIM Process is also known in the prior art as described in EP 0748 685 to prepare contact lenses from polyurethane products.

Figure 2:
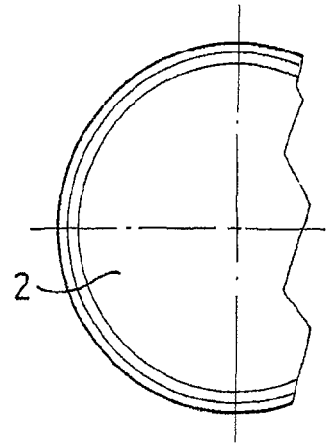
FIG. 2 is a front view of a lens.
Figure 3:
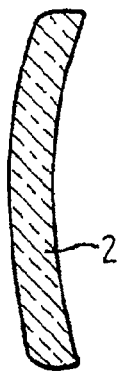
FIG. 3 is a side view of the lens.

According to the invention, the RIM Process will be used for molding an optical element such as a lens 2 having a substantially circular shape and a transversal thickness as shown on FIGS. 2 and 3.

Figure 5:
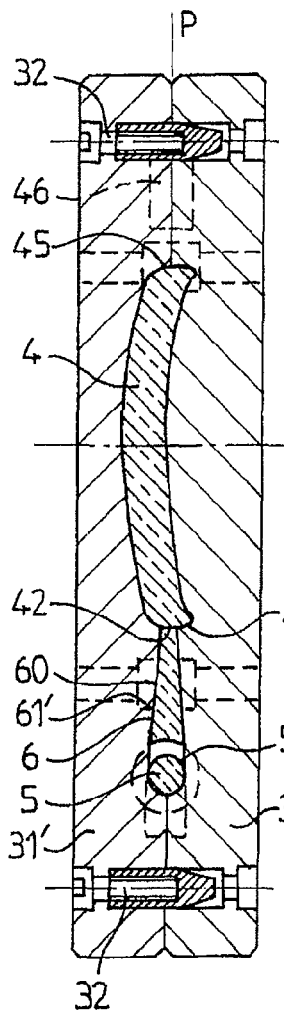
FIG. 5 is a cross-sectional view of the device of FIG. 4.
Figure 4:
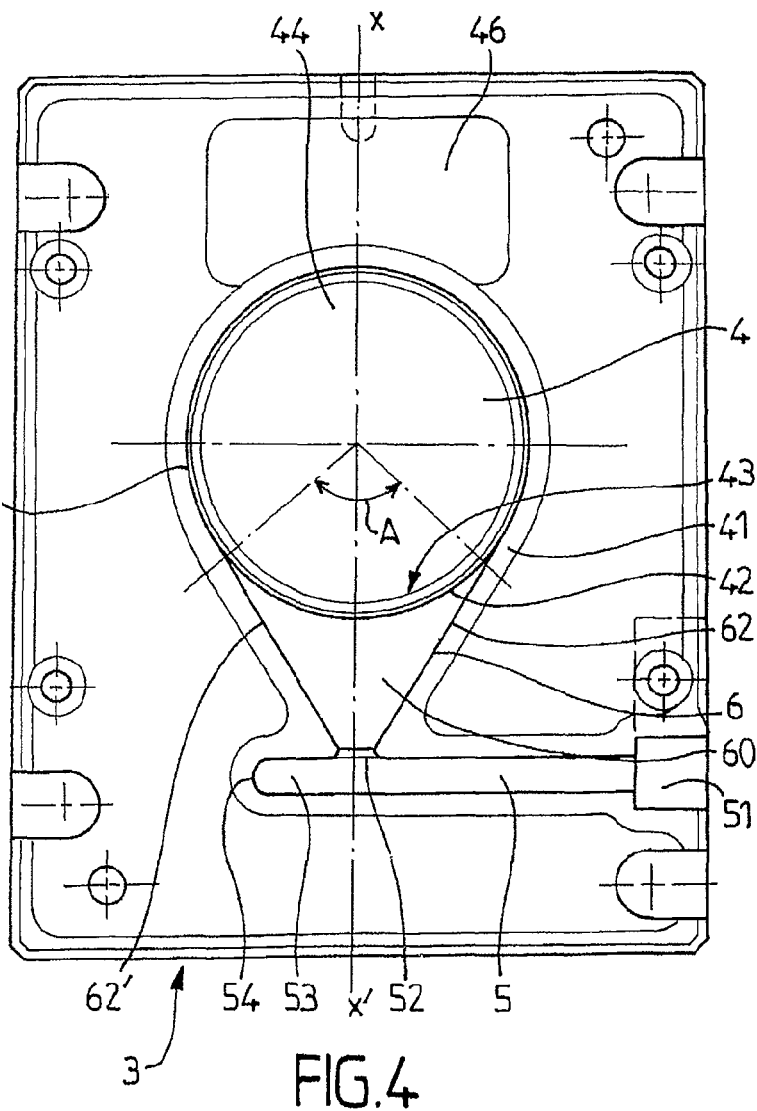
FIG. 4 is a front view of a molding device according to the invention.

Thus, the molding device 3 comprises, as represented on FIGS. 4 and 5, two plates 31, 31' limiting a mold cavity 4 having a circular shape and a transversal thickness corresponding to those of the element 2 to be obtained.

As indicated on FIGS. 4 and 5, the mold 3 comprises an injection duct 5 having an inlet opening 51 and an outlet opening 52 connected by a spout 6 to a casting opening 42 provided on an entry side 43 of the mold cavity 4. The injection duct 5, the spout 6 and the mold cavity 4 are constituted by opposed recesses provided in the two plates 31, 31' of the mold 3 which are pressed together by screws 32.

An elongated seal 41 is inserted between the two plates 31, 31' along the side of the mold cavity 4, said seal 41 resisting to the pressure inside the cavity 4 during filling and curing.

The spout 6 provides a substantially flat space 60 having an axis x'x passing by the center of the circular mold cavity 4 and the center of the outlet opening 52 of the injection duct 5. Said spout 6 is limited by two flat faces 61, 61' and two diverging lateral sides 62, 62' which are symmetrically inclined on either side of the axis x'x and tangentially connect to the circular side 45 of the mold cavity 4.

Thus, the spout has a narrow rectangular section progressively enlarging until the curvilinear casting opening 42 of the mold cavity 4 which widely opens along a sector A of the circular side 45, said sector being, for example of 90°.

As represented on FIG. 4, the flat faces 61, 61' of the spout 6 each have a substantially trapezoidal shape with a short base connecting to the outlet opening 52 of the injection duct 5 and a large curvilinear base extending along said sector A of the mold cavity.

Figure 6:
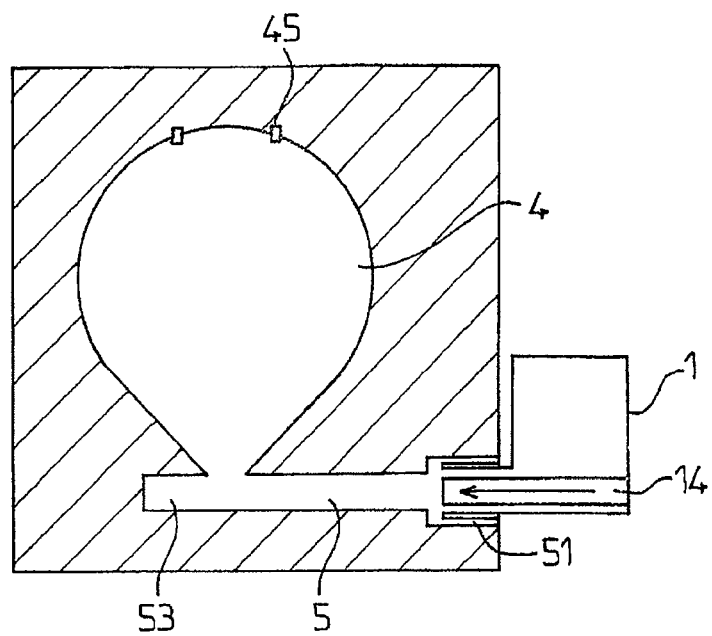
FIG. 6 is a schematical view of a molding device according to a first embodiment of the invention.

As indicated on FIG. 6, the outlet 15 of the pressing chamber 13 of the mixhead 1 is preferably directly connected to the inlet opening 51 of the injection duct 5, but this is not necessary.

Thus, the reaction mixture forced by the plunger 14 flows successively in the injection duct 5, the outlet opening 52 and the spout 6 for filling the mold cavity 4.

However, the mixture obtained by jet-impingement of the reactants injected in the mixing chamber 12 contains a small quantity of air producing a bubbles nucleation as pressure drops suddenly in the turbulent flow. Due to the pressure in the pressing chamber 13 and the injection duct 5, such bubbles are dissolved in the mixture but, during curing in the mold cavity, the exothermic polymerizing reaction produces a growing of the bubbles. According to the invention, these bubbles are evacuated before solidification of the mixture, for avoiding entrapment of air bubbles in the lens.

To this end, air evacuation means are provided on the side 44 of the cavity 4 opposed to the entry side 43.

For facilitating air evacuation, the mold cavity 4 extends along a median plane P which is preferably vertical or inclined by an angle different from zero, the evacuation side 44 being higher than the entry side 43.

The flat space 60 of the spout 6 with a progressive enlarging transversal section produces a laminated flow of the mixture which emerges on the whole width of the cavity 4 and fills it without turbulence, thus avoiding air entrapment and permitting an immediate evacuation of the air bubbles which grow progressively in the liquid mixture.

Indeed, the air contained in the mixture remains dissolved by the pressure applied until the outlet 52 of the injection duct 5 and then, the progressive enlarging section of the spout 6 provides, between the flat faces 61, 61', a laminated flow with a progressively decreasing pressure. Thus, the bubbles appearing and growing progressively in this flow during filling the mold cavity 4 are regularly distributed in the mixture and may be immediately evacuated by the upper side 44 of the cavity 4 opposite to the spout 6.

For this purpose, as represented on FIG. 6, air evacuation means are provided on the upper side 44 of the cavity 4, for example two small vents 45 provided in the seal 41 surrounding the cavity 4 opening directly in the air or in a space 46 connected to vacuum means.

Figure 7:
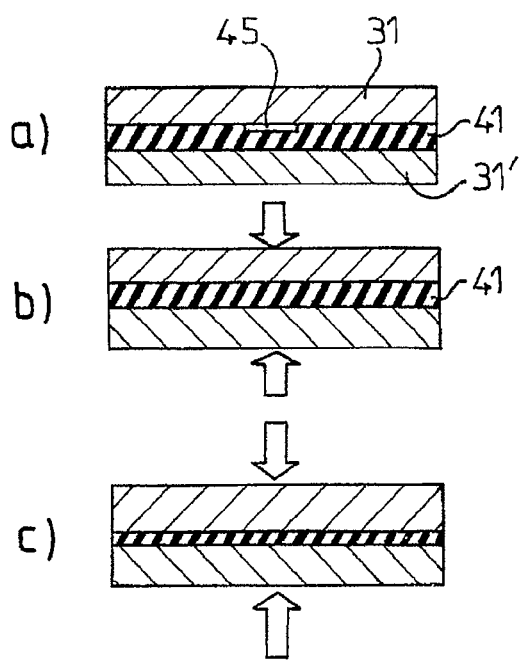
FIG. 7 shows schematically how the seal is compressed.

FIG. 7 schematically represents the successive steps of the process.

During mold filling, air is evacuated by the vents 45 provided in the seal 41 (FIG. 7*a*).

At the end of mold filling, the mold clamping force is increased (FIG. 7*b*) and the seal 41 is compressed in order to close the vents 45. Flow of reactants by the vents is avoided and a post-injection pressure can be applied by the plunger 14 which, for example, may penetrate in the inlet opening 51 of the injection duct 5. Thus, the air still contained in the mixture remains dissolved and no bubble appears until solidification of the molded lens.

During curing, the clamping force is one more time increased (FIG. 7*c*) in order to compensate for shrinkage at the surface of the lens 2.

After solidification, the molded piece may be withdrawn from the mold 3 and the part corresponding to the spout 6 may be broken, a rounded lens 2 without bubbles being obtained.

It has been observed that the front part of the mixture flowing from the chamber 13 of the mixhead 1 in the injection duct 5 and being in contact with air, is more subjected to bubbles nucleation. Therefore, as represented on FIG. 4, the injection duct 5 is advantageous prolongated by a part 53 extending in the flow direction from the outlet opening 52 until a closed end 54, said part 53 forming a reserve for trapping the first part of the mixture flowing upwards in said injection duct 5 before entering in the enlarging spout 6.

Besides, the vent 45 may open in a second cavity 46 provided in the two plates 31, 31' and connected, for example, with vacuum means.

As indicated on FIG. 7, each vent 45 is constituted by at least an aperture which is small enough to avoid the molded mixture to flow outside, said aperture being provided in the seal 41 and closed by compression of the seal as indicated on FIG. 7*b*.

Figure 8:
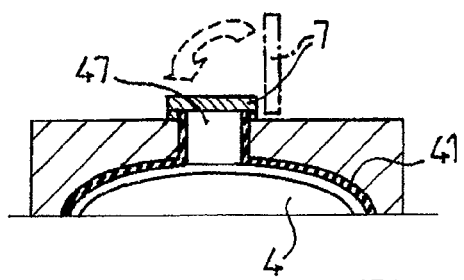
FIG. 8 is a partial schematical view of a vent for air evacuation according to a second embodiment.

However, as indicated on FIG. 8, the mold may be provided with a larger aperture forming a unique vent which may be closed by a removable valve 7, said valve 7 being open during mold filling and being closed after air evacuation, for applying a post injection pressure in the mold cavity 4.

Thus, the invention allows using of the R.I.M. process for obtaining optical lens from polymerized reactants with a high productivity. It should be noted that such a process allows a very broad choice of reactants.

Figure 9:
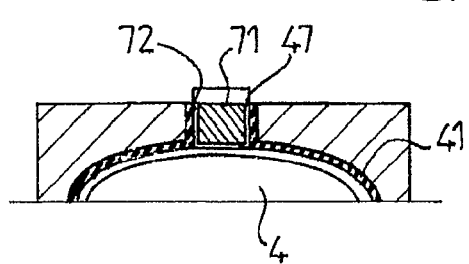
FIG. 9 and FIG. 10 show schematically other embodiments for air evacuation.

According to another embodiment shown on FIG. 9, the aperture 47 may be closed by a plug 71 which is, at the ambient temperature, smaller than the aperture 47 for providing a slight play 72 allowing air evacuation during filling of the mold cavity by the injected mixture, said plug 71 expanding and closing said play 72 by increasing of its temperature when the mold cavity 4 is completely filled by the liquid mixture.

Moreover, the invention is not limited to the details of the various embodiments described hereabove only as examples, other variants and other improvements being conceivable without departing from the protective scope defined by the claims.

Figure 10:
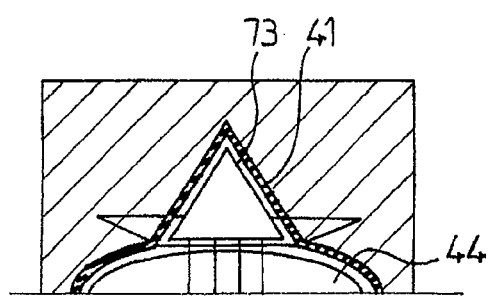

Indeed, as represented on FIG. 10, the air evacuation means could be constituted by a space 73 largely opening on the evacuation side 44 of the mold cavity 4 for trapping air contained in the molded mixture, said mold cavity 4 and said space 73 being surrounded by a common continuous seal 41. In this case, a part of the mixture eventually penetrating in said space 73 could be eliminated after solidification and withdrawing the lens from the mold.

Moreover, as indicated on FIGS. 4 and 5, the mold cavity 4 is advantageously vertical or inclined during filling and thus comprises the lowest part 43 constituting the entry side of the mixture and a highest part 44 constituting the air evacuation side. However, in some cases, it could be possible to use an horizontal mold cavity 4.

Besides, as indicated on FIG. 5, the flat trapezoidal faces 61, 61' of the enlarging spout 6 may be symmetrically inclined by a slide angle on either side of the median plane P of the mold cavity 4, said faces 61, 61' slightly converging from the outlet opening 52 of the injection duct 55 to the inlet opening 42 of the mold cavity 4. Thus, the progressive decreasing of the pressure in the enlarging spout 6 may be controlled for having a better distribution of the mixture on the whole width of the mold cavity 4.

The reference signs inserted after the technical characteristics mentioned in the claims are intended only to facilitate the understanding of said claims and in no way limit their scope.

The invention claimed is:

1. A molding installation for forming an optical lens having a substantially circular shape and a substantially regular transversal thickness comprising:
    a mixing chamber for preparing a mixture to be molded;
    a sealed mold cavity with a substantially circular shape, comprising a center, and a transversal thickness corresponding to that of the lens to be obtained, the mold cavity being limited by two plates between which is inserted an elongated seal, and comprising an entry side provided with a casting opening and an evacuation side opposite to the entry side;
    an injection duct connecting the mixing chamber to the mold cavity, the injection duct having an outlet opening;
    a spout connecting the outlet opening of the injection duct to the casting opening of the mold cavity;
    a filler adapted to force the flow of the mixture from the mixing chamber to the mold cavity via the injection duct and the spout for filling the mold cavity under pressure during use; and
    at least a vent on the evacuation side of the mold cavity;
    the spout defining a substantially flat space having an axis substantially passing by the center of the mold cavity and being limited by two flat faces and two diverging sides inclined on either side of the axis and tangentially connecting to the circular shape of the mold cavity.

2. The molding installation of claim 1, wherein the injection duct is prolongated by a portion extending from the outlet opening up to a closed end, the portion forming a reserve for trapping a first part of the mixture flowing in the injection duct.

3. The molding installation of claim 1, wherein the vent provided on the evacuation side of the mold cavity comprises at least an aperture which is small enough to avoid reactants contained in the mixture to flow outside.

4. The molding installation of claim 1, wherein the vent provided on the evacuation side of the mold cavity is closed by a removable valve, the valve being open during mold filling and being closed after air evacuation and during the application of a post-injection pressure in the mold cavity.

5. The molding installation of claim 1, further comprising a space opening on the evacuation side of the mold cavity and adapted to trap air contained in the mixture, the mold cavity and the space being surrounded by a common continuous seal.

6. The molding installation of claim 1, wherein the vent comprises an aperture provided in the seal on the evacuation side of the mold cavity.

7. The molding installation of claim 6, the molding installation being adapted for the application of a post-injection pressure in the mold cavity after filling and air evacuation, the pressure compressing the seal and closing the vent during use.

8. The molding installation of claim 7, further defined as comprising a plug adapted to close the aperture during use wherein there is slight play for allowing air evacuation during filling of the mold cavity by the injected mixture, and the plug is adapted to expand and close the play due to an increase of the temperature when the mold cavity is filled.

9. The molding installation of claim 1, wherein the mold cavity extends along a titled median plane making an angle different from zero with a horizontal plane and comprises a low entry side and a high evacuation side, wherein the spout is an enlarging spout, and wherein the two flat faces are trapezoidal.

10. The molding installation of claim 9, wherein the flat trapezoidal faces of the enlarging spout are substantially parallel to the median plane of the mold cavity.

11. The molding installation of claim 9, wherein the flat trapezoidal faces of the enlarging spout are symmetrically tilted at an angle on either side of the median plane of the mold cavity, and the flat faces slightly converge from the outlet opening of the injection duct to the inlet opening of the mold cavity.

* * * * *